Figure 3:
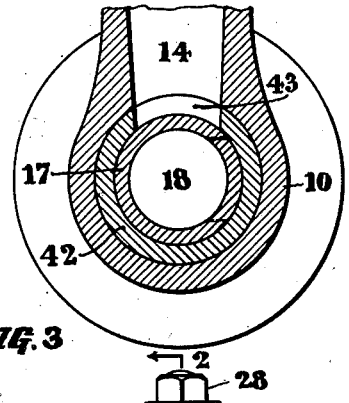

Feb. 4, 1936.     J. V. SCHMID     2,029,837
BLOW-OFF VALVE
Original Filed Nov. 2, 1929     3 Sheets-Sheet 1

INVENTOR.
John V. Schmid,
BY Robert M. Barr
ATTORNEY.

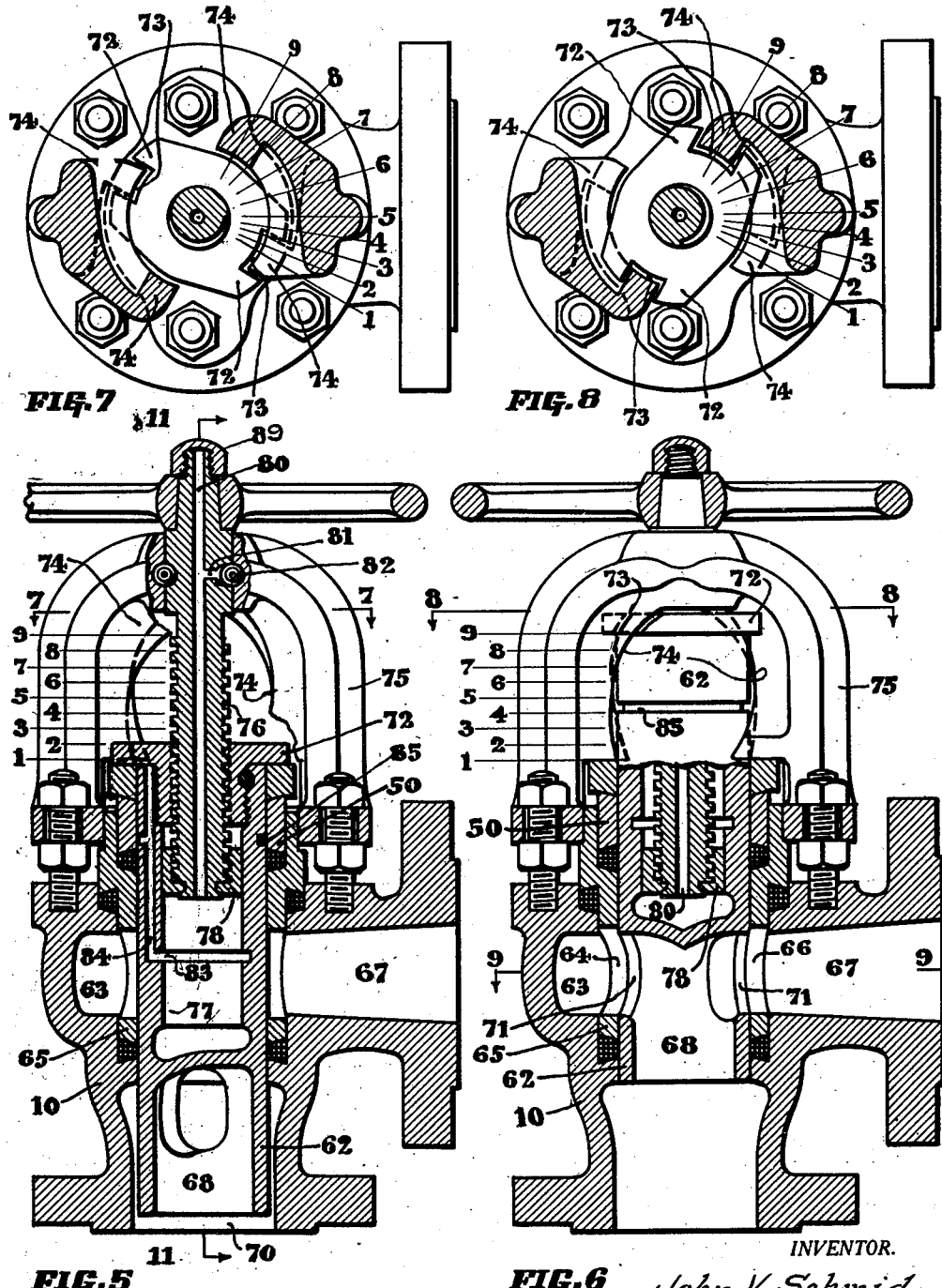

Feb. 4, 1936.                J. V. SCHMID                2,029,837
                            BLOW-OFF VALVE
                Original Filed Nov. 2, 1929    3 Sheets-Sheet 3

INVENTOR
John V. Schmid,
BY
Robert M. Barr.
ATTORNEY

Patented Feb. 4, 1936

2,029,837

UNITED STATES PATENT OFFICE 2,029,837

BLOW-OFF VALVE

John V. Schmid, Philadelphia, Pa.

Application November 2, 1929, Serial No. 404,218
Renewed June 27, 1935

26 Claims. (Cl. 251—80)

The present invention relates to valves and more particularly to a new and improved blow-off valve.

In blow-off valves as heretofore constructed, trouble almost invariably occurs and leakage follows, due to the fact that the opening and closing of the valve exposes the packing to the direct action of the relatively high water pressure. In attempts to overcome leakage due to the loosening of the packing, means have been provided which operate simultaneously with the movement of the valve to increase the pressure upon the packing rings so that the packing may better resist the escaping pressure, but a fault of this construction is that this pressure is applied to the packing at the very time when the valve body should move freely and in consequence, the increased friction transmitted through the packing makes it difficult to readily open the valve. Another objection to the ordinary blow-off valve is that the closing of the outlet port takes place more or less gradually and an excess amount of water escapes from the boiler before the control member can be closed. Furthermore, movement of the reciprocating member is resisted by the pressure against it of the discharging contents.

Some of the objects of the present invention are to provide an improved blow-off valve wherein the control member increases the compression exerted upon the packings when it is moving to closed position and relieves such compression when the control member is moving to open position; to provide a yoke and packing adjustment for blow-off valves wherein compression of the packings is removed in one direction of movement of the control member; to provide an improved follower gland for the control member of a blow-off valve wherein its port always maintains a full registering position with the inlet port of the valve; to provide means in a blow-off valve for preventing blow-off pressure from reaching the packing until the control member is in its full open position; to provide a control member for a blow-off valve wherein it is necessary to rotate the control member to bring its port into register with the inlet and outlet ports of the valve; to provide a control member for a blow-off valve having in association therewith, an operating mechanism for varying the rotational speed of the control member relative to the valve body; to provide means for causing an accelerating turning movement of the control element of a blow-off valve; to provide a blow-off valve construction wherein the blow-off valve is automatically balanced on opposite sides of the control member and to provide other improvements as will hereinafter appear.

Figure 4:
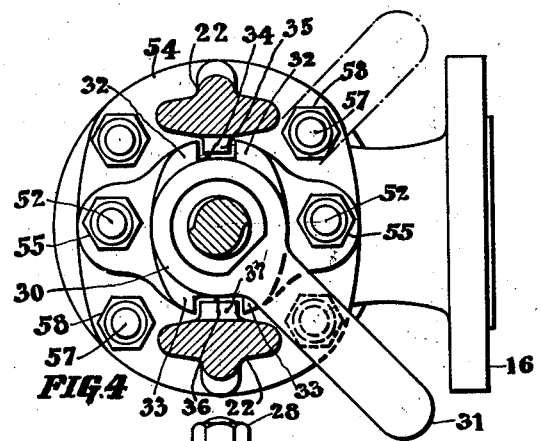
Figure 1:
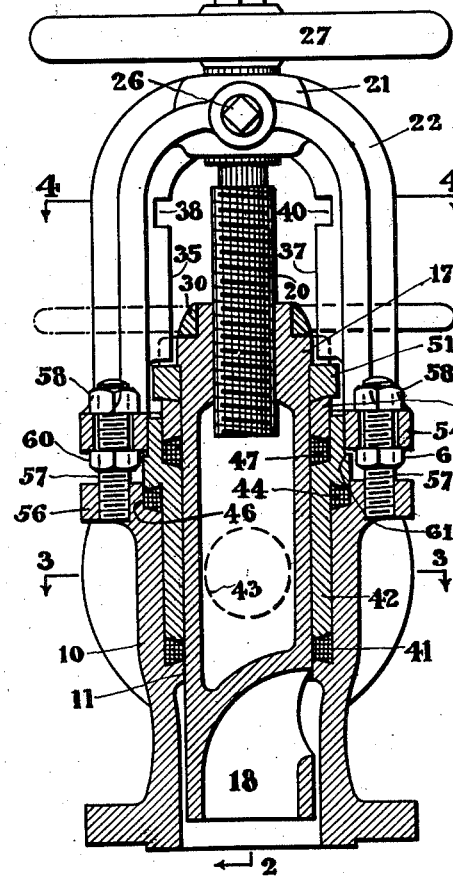
Figure 2:
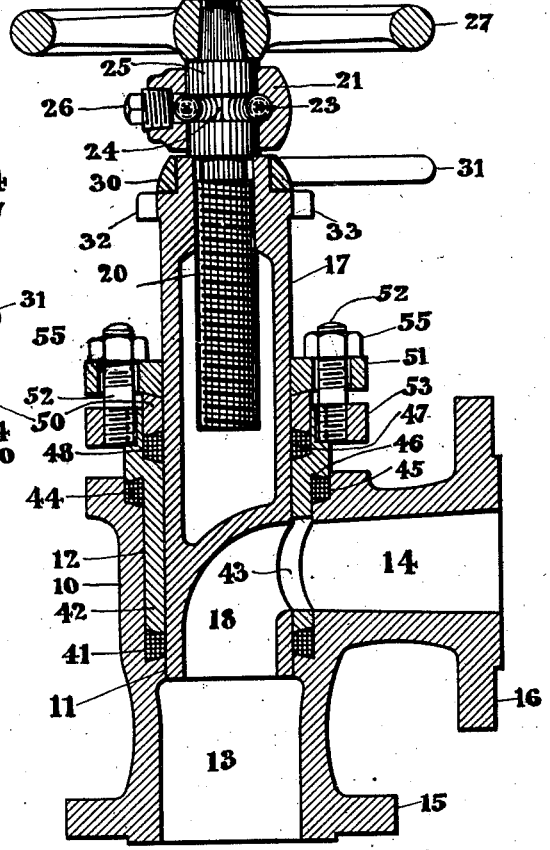
Figure 9:
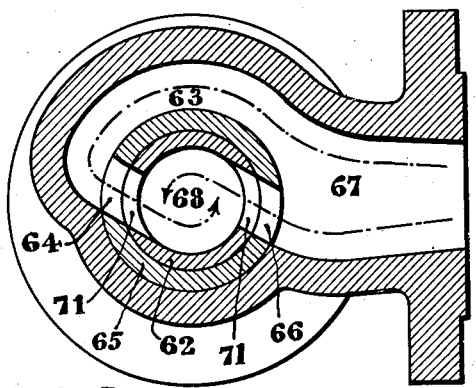
Figure 10:
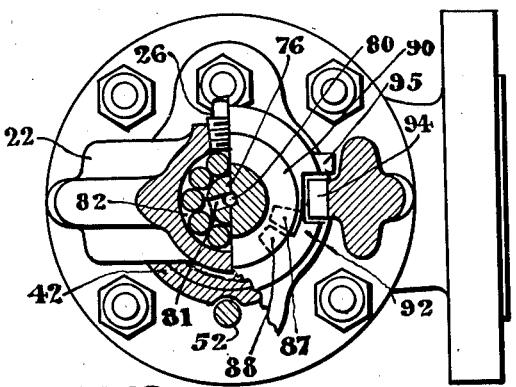
Figure 11:
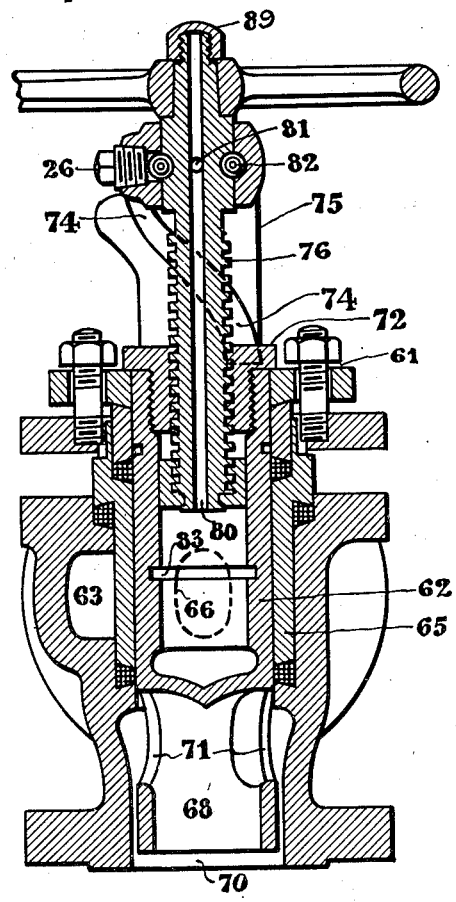
Figure 12:
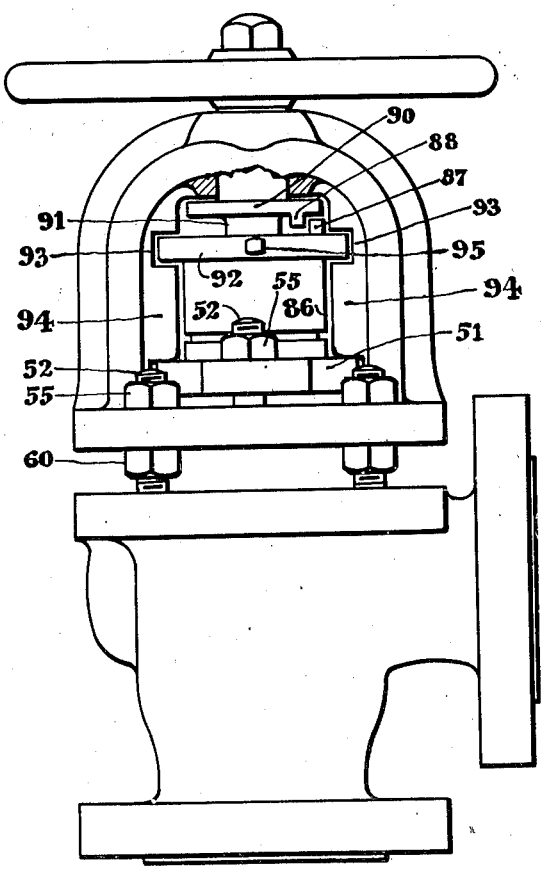

In the accompanying drawings, Figure 1 represents a side elevation broken away to show in section details of a blow-off valve embodying one form of the present invention and with the ports in closed position; Figure 2 represents a section on line 2—2 of Figure 1 but with the ports in open position; Figure 3 represents a section on line 3—3 of Figure 1; Figure 4 represents a section on line 4—4 of Figure 1; Figure 5 represents a sectional elevation of a blow-off valve embodying another form of the invention and with the ports in closed position; Figure 6 represents a section similar to Figure 5 but with the ports in open position; Figure 7 represents a section on line 7—7 of Figure 5; Figure 8 represents a section on line 8—8 of Figure 6; Figure 9 represents a detail taken on section 9—9 of Figure 6; Figure 10 represents a plan of Figure 12 partly broken away; Figure 11 represents a sectional elevation on line 11—11 of Figure 5; and Figure 12 represents a side elevation of a blow-off valve embodying another form of the invention.

Referring to the drawings and particularly to Figures 1 to 4 inclusive wherein one form of the invention is shown comprising a valve body 10 having a bore 11 and a counterbore 12 therethrough communicating in coaxial relation with an outlet port 13 and laterally with an inlet port 14. Flanges 15 and 16 respectively encircle the ports 13 and 14 and serve as a means for attaching a valve body to a pipe line as will be understood.

In order to control communication between the ports 13 and 14 so that the valve can be opened or closed as required, a control member 17 is provided which is here shown in the form of a hollow cylinder having a diameter corresponding to the diameter of the bore 11 and having a length such as to allow it to be properly actuated from the exterior of the valve body 10. A port 18 is formed in the control member 17 and is of such a contour as to form a continuation of the passages 13 and 14 when it is brought into register therewith, and in the present instance the construction is such that communication between the inlet port 14 and the port 18 is cut off when the control member is rotated approximately ninety degrees and is open when the control member is turned back to the same angle. This specific angular movement of the control member 17 is not limited to this arc of travel since obviously it may be varied within limits and the only requirement is that it be capable of so turning to two positions, one to establish communication between the ports 13 and 14 and the other to cut off communication therebetween. It should be noted however, that the control member 17 is given a movement in an axial direction and also a turning movement for control purposes so that in closed position it not only brings the inlet to the passage 18 out of register with the inlet port 14, but also brings it entirely out of the plane of the aforesaid port 14.

For the purpose of moving the control member 17 axially within the valve body 10, it has threaded engagement with a feed screw 20 which is fixed against axial movement in a bearing 21 of a yoke 22 which latter extends outwardly from the valve body 10 and is supported thereby in a manner to be hereinafter described. In the present instance, the thrust of the feed screw is taken by a plurality of balls 23 arranged in a ball race 24, one portion of which is in a shank 25 of the feed screw 20 and the other portion of which is in the yoke 22 and in consequence, the balls 23 are each located partly in the shank 25 and partly in the yoke 22. Access is had to the ball race 24 by an opening provided in one side of the yoke 22 and closed by a plug 26. In assembling this bearing construction, the plug 26 is removed and the balls passed one at a time through the hole into the ball race and when the latter is filled, the plug 26 is replaced. This construction minimizes the friction of the rotatable feed screw and facilitates the axial travel of the control member 17 from one position to another. The end of the shank 25 carries a handwheel 27 held in place by a nut 28 whereby the feed screw 20 can be actuated.

In order to rotate the control member 17 from open to closed position or vice versa, it has fixed thereto a hub 30 on a hand lever 31 which latter extends radially outward to a convenient position to grasp for turning it in one direction or the other. Since it is desired to move the control member 17 axially until the inlet to the port 18 lies in the plane of the port 14 before any turning movement takes place, the projecting end of the control member 17 is provided at diametrically opposite locations with two pair of spaced ears 32 and 33, the former providing a vertically disposed guide slot 34 for a vertical rib 35 inwardly projecting from one of the legs of the yoke 22, and the latter providing a vertically disposed guide slot 36 for a vertical rib 37 inwardly projecting from the other leg of the yoke 22. Preferably the dimensions of the two ribs 35 and 37, as well as the slots 34 and 36 are different so that the control member 17 must be assembled with its port 18 in proper position for cooperation with the ports 13 and 14. The ribs 35 and 37 are respectively provided with transverse slots 38 and 40 located in the same plane and of a size to permit the free lateral passage of the ears 32 and 33. The slots 38 and 40 are above the top of the valve body 10 the necessary distance to allow the port 18 to be brought into the plane of the port 14, and hence the control member 17 is no longer locked against rotation but can now be turned by the hand lever 31 to bring the port 18 into or out of register with the port 14 according to requirements.

As a means for preventing leakage between the valve body 10 and the control member 17, an annular packing ring 41 is located in the bottom of the counterbore 12 and is there held in place by a sleeve 42 which projects through the end of the valve body 10, encircling the control member 17 and snugly filling the counterbore 12. This sleeve is arranged to have a fixed position in which an outlet 43 is in register with the port 14, such position being definitely determined by the arrangement of certain associated and controlling parts. A second annular packing ring 44 encircles the sleeve 42 above the plane of the port 14, this ring seating in a groove 45 formed in the annular face of the valve body 10 where it is held compressed by a circumferential shoulder 46 formed on the sleeve 42. This ring 44 prevents leakage along the joint between the valve body 10 and the sleeve 42 at one side of the port 14 while the packing ring 41 serves a similar purpose between the control member 17 and the valve body 10 below the plane of the port 14.

Leakage between the control member 17 and the sleeve 42 is prevented by a packing ring 47 located in a seat formed by a groove 48 in the upper end of the sleeve 42. This packing ring 47 is maintained under pressure by means of a flange plate 51 which encircles the control member 17 and fits closely thereabout. The plate 51 is held in compressing position by stud bolts 52 threaded into a ring flange 53, formed as an integral part of a cap plate 54, by means of nuts 55. The threaded ends of the bolts 52 pass freely through the flange plate 51 so that the nuts 55 can take up upon the gland 50 when necessary. It should be noted that the sleeve 42 is recessed at the two locations of the bolts 52 in order that the latter can fit therein to prevent the sleeve 42 from turning. This construction is clearly shown in Fig. 10.

For placing the packing rings 41 and 44 under normal compression, the cap plate 54 is bolted to the ring flange 56 of the valve body 10 by stud bolts 57 and nuts 58 which latter engage the top of the plate 54 as will be understood. These stud bolts 57 are arranged to be held in set position by lock nuts 60 interposed between the cap plate 54 and the flange ring 56 which nuts are relatively shallow in thickness to provide a clearance between one face of each and the top face of the flange ring 56. These lock nuts 60, being on the stud bolts 57 which thread into the flange 56, act to resist the thrust of the yoke 22 when opening the valve and thereby prevent increased pressure upon the packing 44 when it should have a minimum pressure to allow easy opening of the valve. In other words the adjusted position of the nuts 60 maintains a definite rigid spacing of the ring plate 54 from the flange 56, so that when the ears 32 and 33 engage the ring 51 there can be no loosening of the stud bolts 57. This construction make it unnecessary to be continually tightening the nuts 58. In connection with this construction it should be noted that the outer diameter of the top end of the sleeve 42 is reduced in diameter to provide a circumferential shoulder 61 which is in a downward path of the cap plate 54. It should also be noted that the threaded lower ends of the bolts 52 do not thread into the sleeve 42 and hence the latter is free to move relative to the ring 53 when pressure is applied to the gland 50 by means other than the tightening of the nuts 55. This other means of applying pressure are the ears 32 and 33 which in the closed position of the control member 17 contact with the top of the ring flange 51 and hence increase the pressure upon the packings as the handwheel 27 reaches the end of its closing movement.

From the foregoing it will be evident that the three packings are always maintained under a leak-proof pressure by the adjustment of the retaining bolts 52 and 57, the former exerting pressure upon the gland 50 and the latter upon the sleeve 42. Also it will be seen that when the valve is in its closed position the pressure contact of the ears 32 and 33 with the top of the ring plate 51 will cause the latter to place an additional compression action upon the gland 50 which will be transmitted through the packing ring 47 and the sleeve 42 to the rings 41 and 46, and thereby ensure a tight packing when the valve is closed. It should be noted that the engagement of the ears 32 and 33 with the ring 51 does not cause the stud bolts 57 to be loosened by reason of the fact that the lock nuts 60 maintain the gripping action of the bolt heads 58 with the plate 56. Thus it is never necessary to be continually tightening the nuts 58. This is a very desirable feature also in connection with the opening of the control member 17 since the counterthrust of the valve body 10 through the bolts 57, as initiated by the turning of the feed screw 20, prevents a drawing-down of the yoke parts which, unless prevented by the set nuts 60, would cause the sleeve 42 to move in a direction to further compress the packing rings 41 and 46. Such compression of these rings during the opening movement would bring about an increase in the friction and hinder the opening of the control member 17 at the time it should move easiest.

In the construction above described, it should be noted that the control member 17 is arranged to move axially and is locked against turning movement until it reaches the position where the port 18 is in the plane of the inlet port 14 of the valve body 10. When the control member 17 has reached this position, the ears 32 and 33 are respectively in register with the slots 38 and 40 and therefore the handwheel 31 can be manually operated to turn the control member 17 to its discharge position with the port 18 in register with the inlet port 14. Also in this construction, the pressure of the contents of the boiler is discharged into and against one wall of the control member 17 and may tend to increase the rotational friction of the control member, though in a way this friction is considerably lessened by forming the port 18 in the shape of an arc which guides the discharged products directly to the outlet port 13.

In the form of the invention shown in Figures 5 to 11 inclusive, provision is made for turning the control member at the same time it is being drawn axially from one position to another. Also this modification comprehends a construction which compensates for the discharge pressure, equalizes the effect thereof, and makes the control member exceedingly easy to turn when the pressure is passing therethrough.

For the purpose of relieving the control member 62 in this form of the invention of any pressure tending to bind it during axial or turning movements, the valve body 10 is provided with a passage 63 extending around one side of the control member and registering with a port 64 in one side of the packing control sleeve 65. The opposite side of this sleeve 65 is also provided with a port 66 which opens into the inlet port 67 of the valve body but in this instance this inlet port is gradually converging in shape from its entrance in order to direct a portion of the discharged products into the passage 63. It should also be noted that the port 66 has its side walls inclined with respect to the axis of the inlet port 67 and the like walls of the opposite port 64 are similarly inclined, see Fig. 9, so that the resulting effect is to direct the incoming products from the inlet port 67 to one side of the center of the interior of the control member 62 while the other port directs the products to the opposite side of the center of the same chamber. In this way, the discharged products pass through the two ports in the sleeve and merge together into a common swirling path which has the effect of quickly clearing the discharge port 68 in the control member 62 and exhausting the products through the discharge port 70 of the valve body. The control member 62 is provided with angularly disposed admission ports 71 arranged in registering position of the control member with the ports 64 and 66.

Thus in registered position of the ports 71 respectively with the inlet port 67 and passage 63, the pressure of the discharge is balanced and frictional binding of the control member 62 upon the sleeve 65 is effectually prevented.

In order to turn the control member 62 while it is moving axially within the valve body to thereby make it easy to operate and also to gradually introduce or cut off the pressure from the boiler, two oppositely disposed flanges 72 are formed on the control member 62 and provided respectively with vertically arranged slots 73 which form guides straddling respectively inwardly disposed ribs 74 formed upon the inner face of the yoke 75. Preferably, one of the slots 73 and one of the ribs 74 is wider than the corresponding slot and rib of the other side in order that the parts can only be assembled in their correct position relative to the associated elements. As here shown, the two ribs 74 are of spiral formation and the pitch of the spiral gradually increases from one end to the other so that the resulting turning movement of the control member 62 is given a relatively fast acceleration the closer the control member comes to its full open position. Thus in Figures 5, 6, 7 and 8, nine different rotational positions of the control member are indicated by numbers one to nine inclusive, during a movement of the control member from closed to open position and it will be seen that during the movement of the control member axially from positions one to five inclusive, there will be substantially equal angular turning movements of the member while from positions five to nine inclusive, the angular movement will be increasingly accelerated and hence bring the ports 71 quickly into registering position with the passage 63 and port 66.

As a means whereby a valve of a character heretofore described can be self-lubricating, the end of the feed screw 76 which enters the chamber of the control member 62 is provided with a plunger 78 in sliding contact with the walls of the chamber 77. Lubricating oil is introduced to the chamber 77 by way of a conduit 80 preferably bored axially with the feed screw 76 and opening at one end into the chamber 77 and near its other end communicating with a radial port 81 leading to the ball race 82. With the chamber 77 filled with lubricating oil, movement of the plunger 78 will cause the oil to be forced to the surfaces to be lubricated by way of a circumferential groove 83 in the wall of the chamber and which has communication with a passage 84 extending lengthwise of the control member 62 and communicating near its other end with an exterior circumferential groove 85 on the control member 62 and opening against the face of the gland 50. It will thus be apparent during the movement of the control member 62 that lubricating oil is automatically maintained in contact with faces between which there is relative movement and opening and closing of the valve is thereby relieved of friction and protected against corrosion.

A cap nut 89, while holding the handwheel in place, serves to close the filling end of the conduit 80, and can be removed to introduce oil into the valve. It will be evident that the plunger 78 passes alternately above and below the groove 83 as the sleeve moves to open and closed position and therefore circulates oil from one point to another to maintain complete lubrication.

In the form of the invention shown in Figure 12 another way of turning the control member of a valve of this kind consists in providing the top face of the control member 86 with an upstanding lug 87 so positioned as to be in the path of travel of a depending lug 88 attached to a flange 90 of the feed screw 91. The arrangement and timing of the parts are such that, when the ears or notched ring flanges 92 of the control member 86 reaches the slots 93 in the yoke guides 94, the lug 88 will strike the lug 87 and cause the control member to move with the feed screw member to thus open the blow-off valve. A stop 95 projecting from the control member 86 is arranged to limit the turning of the member 86 to a ninety degree arc. This construction allows both the axial movement and the turning movement of the control member to be governed by the handwheel.

Having thus described my invention, I claim:

1. In a valve, a body having an inlet and an outlet, a control member in said body arranged to open and close communication between said inlet and said outlet, manually operated means for non-rotatably moving said control member axially relative to said body, and means actuated by said moving means for imparting a rotary movement to said control member near the end of its axial movement in valve opening direction.

2. In a valve, a body having an inlet and an outlet, a control member in said body arranged to open and close communication between said inlet and said outlet, manually operated means for non-rotatably moving said control member axially relative to said body, and means actuated by said moving means for imparting a rotary movement to said control member at the beginning of its axial movement in valve closing direction.

3. In a valve, a body having an inlet and an outlet, a control member in said body arranged to open and close communication between said inlet and said outlet, manually operated means for moving said control member axially relative to said body, and means engaged by said control member during its movement for imparting a varying speed rotation to said control member.

4. In a valve, a body having an inlet and an outlet, a control member in said body arranged to open and close communication between said inlet and said outlet, means for moving said control member axially relative to said body, and means for simultaneously imparting a varying speed rotary movement to said control member.

5. In a valve, a body having an inlet and an outlet, a control member in said body arranged to open and close communication between said inlet and said outlet, means for moving said control member axially relative to said body, and means including a spiral guide for simultaneously imparting an increasingly accelerating rotary movement to said control member when moving in one direction.

6. In a valve, a body having an inlet and an outlet, a control member in said body arranged to open and close communication between said inlet and said outlet, means for moving said control member axially relative to said body, and means including a lug on said control member for imparting a rotary movement to said control member when the first said means is operated.

7. In a valve, a body having an inlet and an outlet, a control member in said body arranged to open and close communication between said inlet and said outlet, means for operating said member, and means operative in open position of said control member to cause discharged products to enter said outlet with a swirling action.

8. In a valve, a body having an inlet, an outlet, and a passage leading from said inlet to said outlet, means to divide said passage to cause two streams of discharge products to enter said outlet to cause a unidirectional swirling action, a control member in said body arranged to open and close communication between said inlet and said outlet, and an operating means for said control member.

9. In a valve, a body having an inlet, an outlet, and a passage leading from said inlet to said outlet, means to divide said passage to cause two streams of discharge products to enter said outlet, the respective axes of said streams when entering said outlet being out of register, a control member in said body arranged to open and close communication between said inlet and said outlet, and operating means for said control member.

10. In a valve, a body having an inlet, an outlet, and a passage leading from said inlet to said outlet, means to divide said passage to cause two streams of discharge products to enter said outlet to cause a unidirectional swirling action, a control member in said outlet having a port communicating with said outlet and two inlets respectively to receive said streams, and means to move said control member to bring said inlets into and out of register with the divided portions of said passage.

11. In a valve, a body having an inlet and an outlet, a control member in said body arranged to open and close communication between said inlet and said outlet and having a chamber for a lubricant, means for conducting lubricant from said chamber to different parts of said body and member, means for operating said control member, and means actuated by the movement of said control member for effecting the circulation of said lubricant.

12. In a valve, a body having an inlet and an outlet, a control member having a port for establishing communication between said inlet and outlet in one position of said control member, said sleeve having a chamber for a lubricant, means including a feed screw for operating said control member, said feed screw extending into said chamber, means for conducting lubricant to different parts of said body and control member, and a plunger on said feed screw for causing said lubricant to circulate when said screw is operated.

13. In a valve, a body having an inlet and an outlet, a control member in said body, a plurality of stationary packing rings encircling said control member, means for independently adjusting said packing rings, and means on said control member for increasing the pressure on said packing rings in the closing position of said control member.

14. In a valve, a body having an inlet and an outlet, a control member in said body, a plurality of stationary packing rings encircling said control member, means for independently adjusting said packing rings, means to prevent compression of said packing rings during the opening movement of said control member, and means to compress said packing rings during the closing movement of said control member.

15. In a valve, a body having an inlet and an outlet, a control member in said body, packing rings encircling said control member, a sleeve provided with a port also encircling said control member and means at upper exterior end of said sleeve for preventing said sleeve with said inlet from turning whereby said port is always in register.

16. In a valve, a body having an inlet and an outlet, a control member in said body arranged to open and close communication between said inlet and said outlet, means for moving said control member from one control position to another, a flange at one end of said body, a member including a cap plate for supporting said moving means, packing for preventing leakage between said body and said control member, means for holding said cap plate spaced from said flange and for resisting the counter thrust of said moving means when said control member is moving to open position whereby compression of said packing is prevented, and means above said cap plate to compress said packing.

17. In a valve, a body having an inlet and an outlet, a control member in said body arranged to open and close communication between said inlet and said outlet, means for moving said control member from one control position to another, a flange at one end of said body, a member including a cap plate for supporting said moving means, packing for preventing leakage between said body and said control member, means operative with said cap plate spaced from said flange for resisting the counter thrust of said moving means when said control member is moving to open position whereby compression of said packing is prevented, and means above said cap plate to compress said packing.

18. In a valve, a body having a through passage forming an outlet at one end and a laterally disposed inlet communicating with said passage, a control member movably mounted in said passage having a port to establish communication between said inlet and said outlet in open position of said control member, a sleeve encircling said control member, a packing ring located between said control member and said body and seating on said sleeve, a second packing ring between said sleeve and said body, said two packing rings being at opposite sides of said inlet, means to compress said two packing rings simultaneously, a third packing ring between said control member and said sleeve, and means for placing said third packing ring under compression.

19. In a valve of the blow-off type, a body having an inlet and an outlet, a control member in said body, two stationary packing rings encircling said control member one above and the other below said inlet, and separate means for respectively and independently adjusting said packing in the same direction.

20. In a valve of the blow-off type, a body having an inlet and an outlet, a control member in said body, two stationary packing rings encircling said control member one above and the other below said inlet, means above said body for adjusting one of said packing rings, and means also above said body for adjusting the other of said packing rings.

21. In a valve of the blow-off type, a body having an inlet and an outlet, a control member in said body, two stationary packing rings encircling said control member, a sleeve about said control member extending above and below said inlet and arranged to engage one of said packings, means to move said sleeve to compress the engaged packing without compressing the second packing, and separate means for adjusting the second packing.

22. In a valve of the blow-off type, a body having an inlet and an outlet, a control member in said body, a stationary packing ring between said inlet and outlet, a second packing ring above said inlet, and separate means above said valve body for placing compression on each of said packing rings.

23. In a valve of the blow-off type, a body having an inlet and an outlet, a control member in said body, compressible packing rings about said control member and respectively above and below said inlet port, exterior means above the valve body for compressing said packing rings, and manually operated means to open and close said control member spirally.

24. In a valve, a body having an inlet and an outlet, a control member in said body mounted for both axial and rotary movement, a port in said member for establishing communication between said inlet and said outlet in open position of said control member, packing rings encircling said control member and positioned on opposite sides of said port when the port is in register with said inlet, manually operated means for moving said control member axially, manually operated means for rotating said member to bring said port into and out of register with said inlet when the control member is in one position, and means to compress said packing when moving said control member to closed position and relieving said compression when said control member is moved to open position.

25. In a valve of the blow-off type, a body having an inlet and an outlet, a control member in said body, a stationary packing ring between said inlet and outlet, a second packing ring above the said inlet, and separate means above said valve body for respectively maintaining compression on each of said packing rings during the movement of the control member.

26. In a valve of the blow-off type, a body having an inlet and an outlet, a control member in said body, two stationary packing rings encircling said control member one above and the other below said inlet, and separate exterior means respectively and independently maintaining a perment pressure on said packing in the same direction.

JOHN V. SCHMID.